(12) United States Patent
Gaurav et al.

(10) Patent No.: US 9,710,304 B2
(45) Date of Patent: *Jul. 18, 2017

(54) METHODS AND APPARATUS TO SELECT VIRTUALIZATION ENVIRONMENTS FOR MIGRATION

(71) Applicant: VMWARE, INC., Palo Alto, CA (US)

(72) Inventors: Kumar Gaurav, Bangalore (IN); Hemanth Kumar Pannem, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/707,016

(22) Filed: May 8, 2015

(65) Prior Publication Data

US 2016/0259665 A1 Sep. 8, 2016

(30) Foreign Application Priority Data

Mar. 5, 2015 (IN) .......................... 1094/CHE/2015

(51) Int. Cl.
*G06F 9/46* (2006.01)
*G06F 9/48* (2006.01)
(Continued)

(52) U.S. Cl.
CPC .............. *G06F 9/4856* (2013.01); *G06F 8/60* (2013.01); *G06F 9/455* (2013.01); *G06F 9/5077* (2013.01)

(58) Field of Classification Search
CPC ........ G06F 9/4856; G06F 9/5077; G06F 8/60; G06F 9/455; G06F 9/45558
(Continued)

(56) References Cited

U.S. PATENT DOCUMENTS 7,203,944 B1 * 4/2007 van Rietschote ... G06F 9/45533
718/1
7,356,679 B1 4/2008 Le et al.
(Continued)

FOREIGN PATENT DOCUMENTS

WO 2014145777 9/2014

OTHER PUBLICATIONS

Shrivastava et al. "Application-aware Virtual Machine Migration in Data Centers", 2011 IEEE.*
(Continued)

*Primary Examiner* — Wei Zhen
*Assistant Examiner* — Junchun Wu

(57) ABSTRACT

Methods and apparatus to select virtualization environments are disclosed. An example method includes determining, via a processor, characteristics of a virtualized application that is deployed in an existing virtualization environment. analyzing, via the processor, the characteristics of the virtualized application to select a subset of virtualization environments that are capable of executing the virtualized application, the subset of virtualization environments selected from a set of virtualization environments of different virtualization environment types used in the datacenter, comparing, via the processor, the characteristics of the virtualized application to the virtualization environments of the subset of virtualization environments to determine scores for the virtualization environments, and migrate the virtualized application from the existing virtualization environment to a new virtualization environment based on the scores.

18 Claims, 8 Drawing Sheets

(51) Int. Cl.
*G06F 9/455* (2006.01)
*G06F 9/50* (2006.01)
*G06F 9/445* (2006.01)

(58) Field of Classification Search
USPC .......................................................... 718/102
See application file for complete search history.

(56) References Cited

U.S. PATENT DOCUMENTS

| | | | | |
|---|---|---|---|---|
| 7,484,208 | B1* | 1/2009 | Nelson | G06F 9/45558 |
| | | | | 718/1 |
| 8,396,807 | B1* | 3/2013 | Yemini | G06Q 10/06 |
| | | | | 705/400 |
| 8,458,717 | B1 | 6/2013 | Keagy et al. | |
| 8,615,579 | B1* | 12/2013 | Vincent | G06F 9/4856 |
| | | | | 709/223 |
| 8,914,789 | B2 | 12/2014 | Barros et al. | |
| 2008/0288940 | A1 | 11/2008 | Adams et al. | |
| 2009/0070771 | A1* | 3/2009 | Yuyitung | G06Q 10/06 |
| | | | | 718/105 |
| 2010/0333089 | A1 | 12/2010 | Talwar et al. | |
| 2011/0010721 | A1* | 1/2011 | Gupta | G06F 9/5077 |
| | | | | 718/103 |
| 2011/0131570 | A1 | 6/2011 | Heim | |
| 2011/0145471 | A1* | 6/2011 | Corry | G06F 9/4856 |
| | | | | 718/1 |
| 2011/0209156 | A1* | 8/2011 | Box | G06F 9/5077 |
| | | | | 718/104 |
| 2011/0231899 | A1 | 9/2011 | Pulier et al. | |
| 2012/0054409 | A1* | 3/2012 | Block | G06F 11/1484 |
| | | | | 718/1 |
| 2012/0272234 | A1 | 10/2012 | Kaiser et al. | |
| 2013/0055260 | A1 | 2/2013 | Zlotkin | |
| 2013/0232492 | A1* | 9/2013 | Wang | H04L 61/2084 |
| | | | | 718/1 |
| 2013/0311988 | A1* | 11/2013 | Boss | G06F 9/4862 |
| | | | | 718/1 |
| 2013/0339947 | A1* | 12/2013 | Neary | G06F 9/45558 |
| | | | | 718/1 |
| 2013/0346616 | A1* | 12/2013 | Miki | G06F 9/4856 |
| | | | | 709/226 |
| 2014/0075494 | A1* | 3/2014 | Fadida | G06F 9/45558 |
| | | | | 726/1 |
| 2014/0157363 | A1* | 6/2014 | Banerjee | G06F 9/45558 |
| | | | | 726/2 |
| 2014/0258446 | A1 | 9/2014 | Bursell | |
| 2015/0095443 | A1* | 4/2015 | Yang | H04L 67/1095 |
| | | | | 709/212 |
| 2015/0096011 | A1 | 4/2015 | Watt | |
| 2015/0188927 | A1* | 7/2015 | Santhi | H04L 63/104 |
| | | | | 726/4 |
| 2015/0205542 | A1* | 7/2015 | Antony | G06F 9/45558 |
| | | | | 711/162 |
| 2016/0378537 | A1* | 12/2016 | Zou | G06F 9/4856 |
| | | | | 718/1 |

OTHER PUBLICATIONS

Voorsluys et al. "Cost of Virtual Machine Live Migration in Clouds: A Performance Evaluation", 2009, Springer-Verlag Berlin Heidelberg, pp. 254-265.*

Goiri et al. "Multifaceted Resource Management for Dealing with Heterogeneous Workloads in Virtualized Data Centers", 2010, IEEE.*

Wu et al. "Performance Modeling of Virtual Machine Live Migration", 2011, IEEE.*

Brockmeier, "Containers vs. Hypervisors: Choosing the Best Virtualization Technology", Apr. 13, 2010, http://www.linux.com/component/content/article/186-virtualization/3000, 4 pages.

KB Parallels, "Converting Virtual Containers, Virtual Machines, and Hardware Nodes to each other", http://kb.sp.parallels.com/en/6324, 1999-2014 Parallels. Virtualization and Automation Software, 2 pages.

Virtualization Softwares, "What is Paravirtualization?", http://www.virtualizationsoftwares.com/what-is-paravirtualization/, retrieved on Oct. 23, 2014, 2 pages.

United States Patent and Trademark Office, "Non-Final Office Action," issued in connection with U.S. Appl. No. 14/707,012 on Jul. 14, 2016, 9 pages.

Galan et al., "Autoconfiguration of Enterprise-class Application Deployment in Virtualized Infrastructure Using OVF Activation Mechanisms," Cloud Infrastructure Area—Product Development and Innovation Unit, Telefonica Digital, Madrid, Spain, 6th International DMTF workshop on Systems and Virtualization Management, 2012, 8 pages.

Athanasios Antoniou, "Performance Evaluation of Cloud Infrastructure using Complex Workloads," Master's Thesis in Computer Science, Parallel and Distributed Systems group, Faculty of Electrical Engineering, Mathematics, and Computer Science, Delft University of Technology, Jan. 20, 2012, 77 pages.

Patent Cooperation Treaty, "International Search Report and Written Opinion of the International Searching Authority," issued in connection with Application No. PCT/US2016/020932, mailed Jun. 16, 2016 (11 pages).

Patent Cooperation Treaty, "International Search Report and Written Opinion of the International Searching Authority," issued in connection with Application No. PCT/US2016/020938, mailed Jun. 28, 2016 (11 pages).

* cited by examiner

METHODS AND APPARATUS TO SELECT VIRTUALIZATION ENVIRONMENTS FOR MIGRATION

FIELD OF THE DISCLOSURE

This disclosure relates generally to virtual computing, and, more particularly, to methods and apparatus to select virtualization environments.

BACKGROUND

Virtualizing computer systems provides benefits such as the ability to execute multiple computer systems on a single hardware computer, replicating computer systems, moving computer systems among multiple hardware computers, and so forth.

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

DETAILED DESCRIPTION

Figure 1:
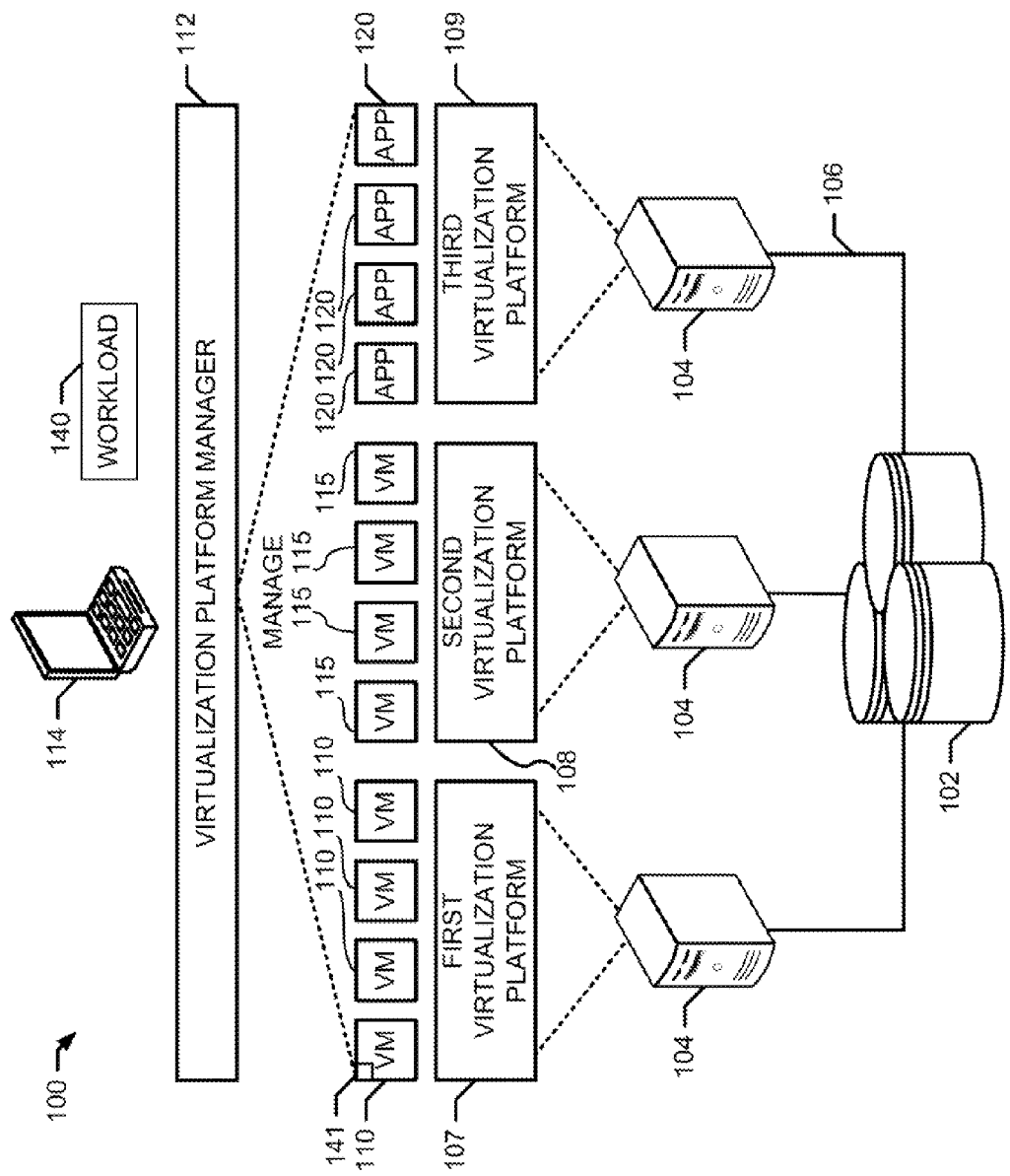
FIG. 1 is a block diagram of an example virtual computing environment in which a virtualization platform manager as may operate as disclosed herein.

Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING," filed Dec. 12, 2012, all three of which are hereby incorporated herein by reference in their entirety.

Physical computing environments include physical computing resources such as servers, storage devices, etc. Physical computing resources may be expensive to maintain and/or may require specialized knowledge to operate and/or service. Virtual computing environments (sometimes referred to as "virtual data centers") virtualize such physical resources or physical components making it possible for someone who does not actually own the physical computing resources (e.g., servers, storage components and networks) to utilize the physical computing resources through commercial transactions. Virtualizing aggregates and presents various physical resources as virtual resources in a virtual computing environment. Additionally or alternatively, virtualization allows for the segregation of workloads executing on the same hardware or same pool of hardware resources. A workload, as used herein, is an abstraction of work that an application instance or a set of applications instances are to perform. For example, a workload may be implementing a web server, a payment processing server, implementing a web server farm, implementing a multilayer application, etc. Thus, virtualization allows for a web server and a payment processing server executing on the same underlying hardware to be segregated, have access to separate virtual hardware, etc.

Many different types of virtualization environments exist. Three example types of virtualization environment are: full virtualization, paravirtualization, and operating system virtualization.

Full virtualization, as used herein, is a virtualization environment in which hardware resources are managed by a hypervisor to provide virtual hardware resources to a virtual machine. In a full virtualization environment, the virtual machines do not have access to the underlying hardware resources. In a typical full virtualization, a host operating system with embedded hypervisor (e.g., VMware ESXi®) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). Typically, in full virtualization, the virtual machine and the guest operating system have no visibility and/or access to the hardware resources of the underlying server. Additionally, in full virtualization, a full guest operating system is typically installed in the virtual machine while a host operating system is installed on the server hardware. Example virtualization environments include VMware ESX®, Microsoft Hyper-V®, and Kernel Based Virtual Machine (KVM).

Paravirtualization, as used herein, is a virtualization environment in which hardware resources are managed by a hypervisor to provide virtual hardware resources to a virtual machine and guest operating systems are also allowed to access to some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

Operating system virtualization is also referred to herein as container virtualization. As used herein, operating system virtualization refers to a system in which processes are isolated in an operating system. In a typical operating system virtualization system, a host operating system is installed on the server hardware. Alternatively, the host operating system may be installed in a virtual machine of a full virtualization environment or a paravirtualization environment. The host operating system of an operating system virtualization system is configured (e.g., utilizing a customized kernel) to provide isolation and resource management for processes that execute within the host operating system (e.g., applications that execute on the host operating system). The isolation of the processes is known as a container. Thus, a process executes within a container that isolates the process from other processes executing on the host operating system. Thus, operating system virtualization provides isolation and resource management capabilities without the resource overhead utilized by a full virtualization environment or a paravirtualization environment. Example operating system virtualization environments include Linux Containers LXC and LXD, Docker™, OpenVZ™, etc.

In some instances, a data center (or pool of linked data centers) may include multiple different virtualization environments. For example, a data center may include hardware resources that are managed by a full virtualization environment, a paravirtualization environment, and an operating system virtualization environment. In such a data center, a workload may be deployed to any of the virtualization environments.

Some methods and apparatus disclosed herein analyze characteristics of a workload to be deployed and characteristic of available virtualization environments to determine a virtualization environment in which to deploy the workload. Some methods and apparatus disclosed herein analyze a workload deployed in a first virtualization environment to determine if the workload should be migrated to a second virtualization environment (of the available virtualization environments). In some such methods and apparatus, the first virtualization environment receives a first score for execution of the workload based on the analysis of the workload, the second virtualization environment receives a second score for execution of the workload based on the analysis of the workload, and the workload is migrated when the second score exceeds (or meets) the first score.

FIG. 1 is a block diagram of an example virtual computing environment 100 in which a virtualization platform manager 112 may operate as disclosed herein.

The example virtual computing environment 100 of FIG. 1 includes an example network of storage arrays 102 in communication with example computing servers 104. The example network of storage arrays 102 may be implemented using any suitable wired and/or wireless storage including, for example, one or more Fiber Channel Storage Area Network (SAN) arrays, one or more Internet Small Computer System Interface (iSCSI) SAN arrays, one or more Network Attached Storage (NAS) arrays, etc. In the illustrated example, the network of storage arrays 102 are connected to and shared between groups of servers 104 through storage area networks, thereby enabling aggregation of storage resources and enabling increased flexibility in provisioning the storage resources to, for example, example virtualization platforms 107, 108, and 109. While the example virtual computing environment 100 includes a single storage array 102 connected to each of the computing servers 104 any number of storage arrays 102 may be utilized and any other type of shared and non-shared storage hardware may be utilized (e.g., hard drives installed in each of the computing servers 104, cloud based on storage resources, etc.).

In the illustrated example of FIG. 1, the example servers 104 may be x86 servers in communication with the example network of storage arrays 102 via an example network 106. The network 106 of FIG. 1 may be implemented using any suitable wired and/or wireless network(s) such as, for example, one or more data buses, one or more Local Area Networks (LANs), one or more wireless LANs, one or more cellular networks, the Internet, etc.

The example virtualization platforms 108-109 of FIG. 1 execute on corresponding ones of the example computing servers 104. According to the illustrated example, the example first virtualization platform 107 implements a full virtualization environment in which example virtual machines 110 execute. The example second virtualization platform 108 implements a paravirtualization environment in which example virtual machines 115 execute. The example third virtualization platform 108 implements an operating system virtualization environment in which example applications 120 execute within containers created by the example third virtualization platform 109. In other implementations any number and/or combination of virtualization platforms and virtualization environments may be utilized.

The example virtualization platforms 107-109 include management tools and systems to facilitate management of the virtualization platforms 107-109. For example, management tools may provide access for an administrator to configure the virtual machines 110, 115 and/or containers for the applications 120. Additionally or alternatively, management tools may provide access for an administrator to configure allocation of the hardware resources of the example servers 104 to the virtualization platforms 107-109. The example virtualization platforms 107-109 may each include separate management tools and systems and/or management tools and systems may be provided for managing the entire virtual computing environment 100. For example, the virtual computing environment 100 may include a cloud management administration system (e.g., the VMware vCloud Automation Center®).

The example virtualization platform 100 includes a first workload 140 that is awaiting deployment. For example, the workload 140 may be a web server, a database server, a credit card processing server, etc. that needs to be deployed on a virtualization platform for execution. The example virtualization platform 100 additionally includes a second workload 141 that is deployed on one of the example virtual machines 110 executing in the example first virtualization platform 107. While the two workloads 140, 141 are provided as examples, any number of to-be-deployed and deployed workloads may be included in an implementation of the example virtual environment 100.

To manage the example virtual computing environment 100, the example virtual computing environment 100 of FIG. 1 includes the example virtualization platform manager 112. The example virtualization platform manager 112 manages assignment of workloads (e.g., the example workload 140 and the example workload 141) to ones of the example virtualization platforms 107-109. According to the illustrated example, the virtualization platform manager 112 is invoked upon receipt of a request to deploy a new workload in the example virtual environment 100. For example, the virtualization platform manager 112 may receive a request from a user utilizing a management client 114, may receive a request from an environment management tool (e.g., a cloud management tool), etc. The example virtualization platform manager 112 is also invoked to review deployed workloads to determine if a workload should be migrated from one virtualization platform 107-109 to another virtualization platform 107-109. For example, the virtualization platform manager 112 may be configured to automatically, periodically (e.g., according to a schedule) analyze deployed workloads, aperiodically analyze deployed workloads, analyze a deployed workload upon a request from a user utilizing the management client 114, analyze all deployed workloads upon a request from a user utilizing the management client 114, etc.

Once invoked, the example virtualization platform manager 112 analyzes characteristics of a workload of interest (e.g., the example workload 140 that is to be deployed or the example deployed workload 141 that is considered for migrating from the example virtualization platform 107 to another one of the example virtualization platforms 107-109) and characteristics of the example virtualization platforms 107-109 to determine which one(s) of the example virtualization platforms 107-109 may be utilized for the workload 141, 140 (e.g., which ones of the example virtualization platforms 107-109 are compatible with the workload 140, 141). When more than one of the example virtualization platforms 107-109 may be utilized for the workload 140, 141, the example virtualization platform manager 112 further analyzes the characteristics of the workload 140, 141 and the characteristics of the example virtualization platforms 107-109 to determine scores for the example virtualization platforms 107-109 (e.g., determines a score for each of the virtualization platforms 107-109 that were determined to be compatible with the workload 140, 141). The example virtualization platform 107-109 deploys or migrates the workload 140, 141 to the one of the example virtualization platforms 107-109 that has the best score (e.g., the highest score, the lowest score, etc.). The example virtualization platform manager 112 may additionally include operations for handling situations when two or more of the virtualization platforms 107-109 receive equivalent scores (e.g., randomly assigning to one of the equivalently scored virtualization platforms 107-109, assigning to one of the equivalently scored virtualization platforms 107-109 in an effort to balance the load on the virtualization platforms 107-109 etc.).

Figure 2:
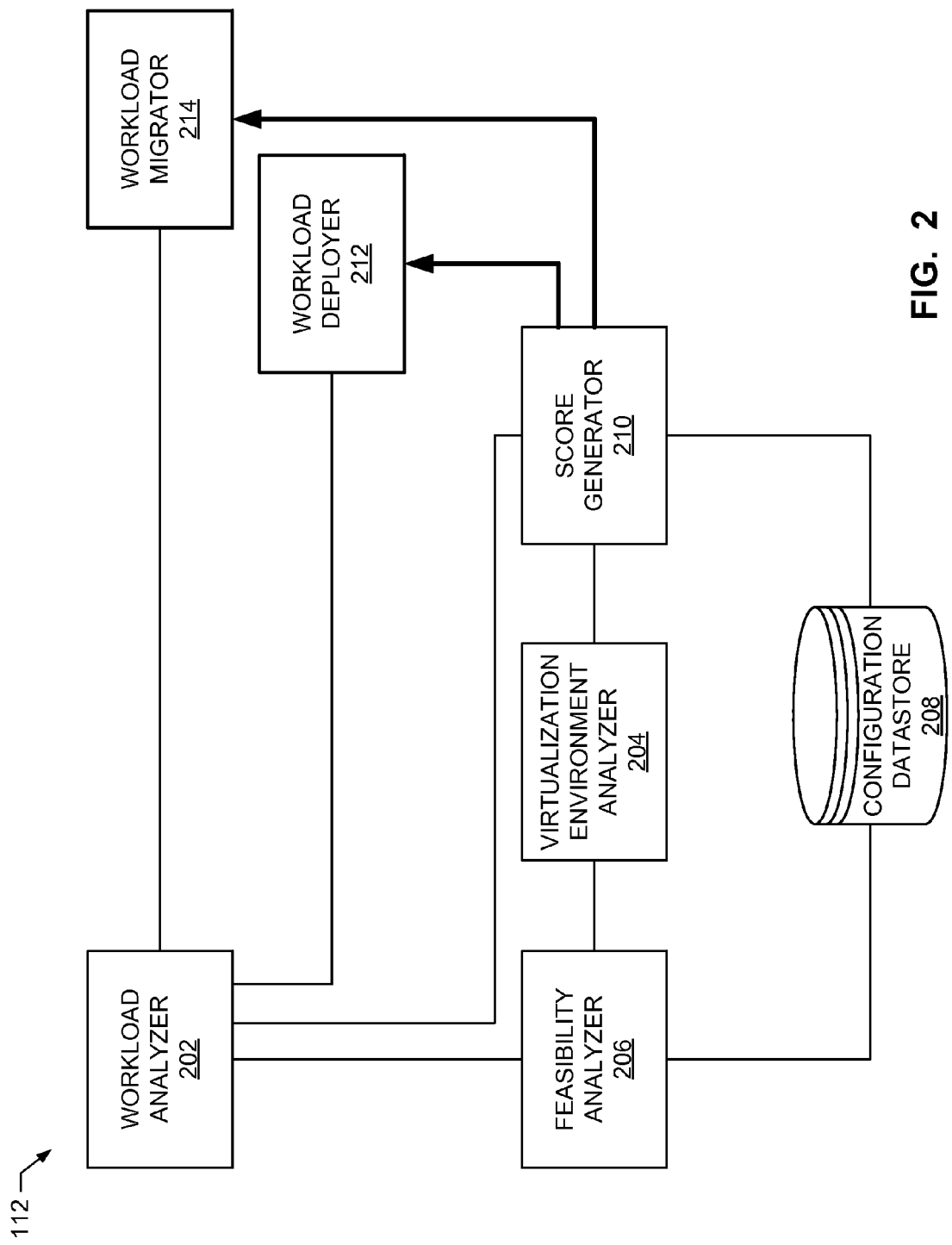
FIG. 2 is a block diagram of an example implementation of the virtualization platform manager.

FIG. 2 is a block diagram of an example implementation of the virtualization platform manager 112. The example virtualization platform manager 112 of FIG. 2 includes an example workload analyzer 202, an example virtualization environment analyzer 204, an example feasibility analyzer 206, an example configuration datastore 208, an example score generator 210, an example workload deployer 212, and an example workload migrator 214.

The example workload analyzer 202 of FIG. 2 analyzes a workload (e.g., the example workload 140 and/or the example workload 141) for which a virtualization platform (e.g., the first virtualization platform 107, the second virtualization platform 108, and/or the third virtualization platform 109) is to be selected. The example workload analyzer 202 analyzes the workload 140, 141 to determine characteristics of the workload 140, 141. For example, the workload analyzer 202 may analyze configuration information for the workload 140, 141 (e.g., a configuration file created during development/creation of the workload 140, 141, configuration settings of the workload 140, 141, etc.). The example workload analyzer 202 determines:

A) computing resource settings, requirements, requests, etc. for the workload 140, 141, B) an operating system of the workload 140, 141 (e.g., a Linux based operating system, Microsoft Windows®, etc.), C) networking requirements of the workload 140, 141, D) whether or not the workload 140, 141 includes a group of elements (e.g., a VMware® vApp or other bundle of virtual machines and/or applications), and E) whether or not the workload 140, 141 will need to be upgraded at a later time (e.g., upgraded by the installation of security patches).

The example workload analyzer 202 may additionally or alternatively gather any other characteristic and/or status information regarding the workload 140, 141. For example, the example workload analyzer 202 may determine the operating status of the workload 140, 141 (e.g., the workload analyzer 202 may determine if the workload 141 is executing and/or is at a state at which the workload 141 can be migrated).

After gathering characteristics for the example workload 140, 141, the example workload analyzer 202 provides the characteristic information to the example feasibility analyzer 206 and the example score generator 210. Additionally, the example workload analyzer 202 provides information about the workload 140, 141 to the workload deployer 212 and/or the workload migrator 214 for use in deploying the workload 140, 141 and/or migrating the workload 140, 141, respectively.

The example virtualization environment analyzer 204 analyzes the example virtualization platforms 107-109 of the example virtual computing environment 100 to determine characteristics of the virtualization platforms 107-109. The example virtualization environment analyzer 204 gathers characteristic information for the virtualization platforms 107-109 by querying application programming interfaces (APIs) of management platforms of the virtualization platforms 107-109. The virtualization environment analyzer 204 may additionally or alternatively analyze configuration information for the virtualization platforms 107-109 by accessing a configuration file associated with the virtualization platforms 107-109, accessing configuration settings of the virtualization platforms 107-109, accessing operating status information for the virtualization platforms 107-109, etc.

The example virtualization environment analyzer 204 determines:

A) operating systems utilized by the virtualization platforms 107-109 and

B) computing resources available in the virtualization platforms 107-109.

The virtualization environment analyzer 204 may additionally or alternatively gather any other characteristic and/or status information regarding the virtualization platforms 107-109.

After gathering characteristics for the example virtualization platforms 107-109, the example virtualization environment analyzer 204 provides the characteristic information to the example feasibility analyzer 206 and the example score generator 210.

The example feasibility analyzer 206 of FIG. 2 retrieves configuration information from the example configuration datastore 208 and, using the configuration information, compares the configuration information to the characteristics of the workload 140, 141 and the characteristics of the virtualization platforms 107-109 to determine which of the virtualization platforms 107-109 are capable of executing the workload 140, 141. An example process for determining feasibility information for executing the workload 140, 141 in the example virtualization platforms 107-109 is described in conjunction with FIG. 5.

The example configuration datastore 208 of FIG. 2 stores configuration information for use in selecting one of the virtualization platforms 107-109 for deploying and/or transitioning the workload 140, 141. The example configuration datastore 208 stores file containing a first set of rules for determining which of the virtualization platforms 107-109 are capable of executing the workload 140, 141 and a second set of rules for scoring the virtualization platforms 107-109 for execution of the workload 140, 141. Alternatively, a single set of rules may be stored and/or additional sets of rules or other configuration information may be stored.

The configuration datastore 208 may be implemented by any type of storage device such as, for example, a hard disk, a flash drive, a network attached storage, the example storage array 102, or any other type of storage. Additionally, the configuration datastore 208 may store configuration in any type of format such as, for example, a comma separated values (CSV) file, an extensible markup language (XML) file, etc.

The example score generator 210 of FIG. 2 retrieves configuration information from the example configuration datastore 208 and, using the configuration information, compares the configuration information to the characteristics of the workload 140, 141 and the characteristics of the virtualization platforms 107-109 to determine scores for the virtualization platforms 107-109 for executing the workload 140, 141. The example score generator 210 receives an identification of one(s) of the virtualization platforms 107-109 that are capable of executing the workload 140, 141. The score generator 210 of the illustrated example determines a score for each of the virtualization platforms 107-109 that are capable of executing the workload 140, 141 according to the feasibility analyzer 206. Thus, the example score generator 210 does not expend computing resources generating scores for ones of the virtualization platforms 107-109 that are not capable of executing the workload 140, 141. An example process for determining a score is described in conjunction with FIGS. 6 and 7.

After generating scores for the example virtualization platforms 107-109, the example score generator 210 of FIG. 2 identifies the selected one of the virtualization platforms 107-109 that has the best score (e.g., the highest score, the lowest score, etc.). The score generator 210 identifies the selected one of the virtualization platforms 107-109 to the example workload deployer 212 and the example workload migrator 214. An example process for determining score information for executing the workload 140, 141 in the example virtualization platforms 107-109 is described in conjunction with FIG. 6.

The example workload deployer 212 of FIG. 2 receives information about the workload 140, 141 from the example workload analyzer 202 and, when the workload 140, 141 is a workload that is to be newly deployed (e.g., the example workload 140), the workload deployer 212 deploys the workload 140, 141 in the virtualization platform 107-109 identified by the example score generator 210. For example, the example workload deployer 212 may transfer the data of the workload 140, 141 to the storage array 102 and cause the workload 140, 141 to be executed on the selected one of the virtualization platforms 107-109 identified by the score generator 210.

The example workload migrator 214 of FIG. 2 receives information about the workload 140, 141 from the example workload analyzer 202 and, when the workload 140, 141 is a workload that is to be migrated from a first one of the virtualization platforms 107-109 to a second one of the virtualization platforms 107-109 (e.g., the example workload 141), the workload migrator 214 migrates the workload 140, 141 to the virtualization platform 107-109 identified by the example score generator 210. For example, the example workload migrator 214 may cause the workload 140, 141 to be turned off, shutdown, suspended, etc. and then transferred to the selected one of the virtualization platforms 107-109 identified by the score generator 210. In another example, the workload migrator 214 may invoke a online conversion in which the workload is analyzed while executing until the workload is fully transferred and then the workload is stopped on the old platform and started on the new platform. Alternatively, any other process for migrating the workload 140, 141 may be utilized.

While an example manner of implementing the example virtualization platform manager 112 of FIG. 1 is illustrated in FIG. 2, one or more of the elements, processes and/or devices illustrated in FIG. 2 may be combined, divided, re-arranged, omitted, eliminated and/or implemented in any other way. Further, the example workload analyzer 202, the example virtualization environment analyzer 204, the example feasibility analyzer 206, the example score generator 210, the example workload deployer 212, the example workload migrator 214 and/or, more generally, the example virtualization platform manager 112 of FIG. 1 may be implemented by hardware, software, firmware and/or any combination of hardware, software and/or firmware. Thus, for example, any of the example workload analyzer 202, the example virtualization environment analyzer 204, the example feasibility analyzer 206, the example score generator 210, the example workload deployer 212, the example workload migrator 214 and/or, more generally, the example virtualization platform manager 112 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example workload analyzer 202, the example virtualization environment analyzer 204, the example feasibility analyzer 206, the example score generator 210, the example workload deployer 212, and/or the example workload migrator 214 is/are hereby expressly defined to include a tangible computer readable storage device or storage disk such as a memory, a digital versatile disk (DVD), a compact disk (CD), a Blu-ray disk, etc. storing the software and/or firmware. Further still, the example virtualization platform manager 112 of FIG. 1 may include one or more elements, processes and/or devices in addition to, or instead of, those illustrated in FIG. 2, and/or may include more than one of any or all of the illustrated elements, processes and devices.

Flowcharts representative of example machine-readable instructions for implementing the virtualization platform manager 112 FIGS. 1 and/or 2 are shown in FIGS. 3-7. In this example, the machine-readable instructions comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 3-7, many other methods of implementing the example virtualization platform manager 112 may alternatively be used. For example, the order of execution of the blocks may be changed, and/or some of the blocks described may be changed, eliminated, or combined.

Figure 3:
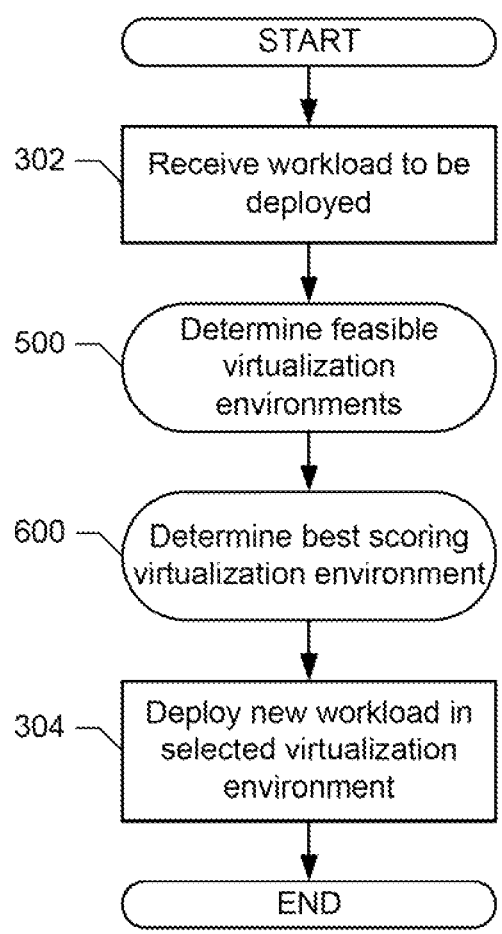
FIGS. 3-7 are flowcharts representative of machine readable instructions that may be executed to implement the example virtualization platform manager of FIGS. 1 and/or 2.

FIG. 3 is a flowchart of example machine readable instructions that may be executed to deploy a new workload (e.g., the workload 140 of FIG. 1). The process of FIG. 3 begins when the workload analyzer 202 receives the new workload 140 to be deployed (block 302). For example, the new workload 140 may be identified by a user utilizing the example management client 114 of FIG. 1, may be received from a cloud management tool, etc. The example virtualization platform manager 112 of FIGS. 1 and 2 then, as described in conjunction with the process 500 of FIG. 5, determines which of the example virtualization platforms 107-109 of FIG. 1 are capable of performing the example workload 140 (block 500). The example virtualization platform manager 112 then, as described in conjunction with the process 600 of FIG. 6, determines which one of the example virtualization platforms 107-109 (of the virtualization platforms 107-109 determined to be capable of executing the workload 140 in block 500) received the best score (block 600). The example workload deployer 212 of FIG. 2 then deploys the new workload 140 in one of the virtualization platforms 107-109 identified in block 600 (block 304).

Figure 4:
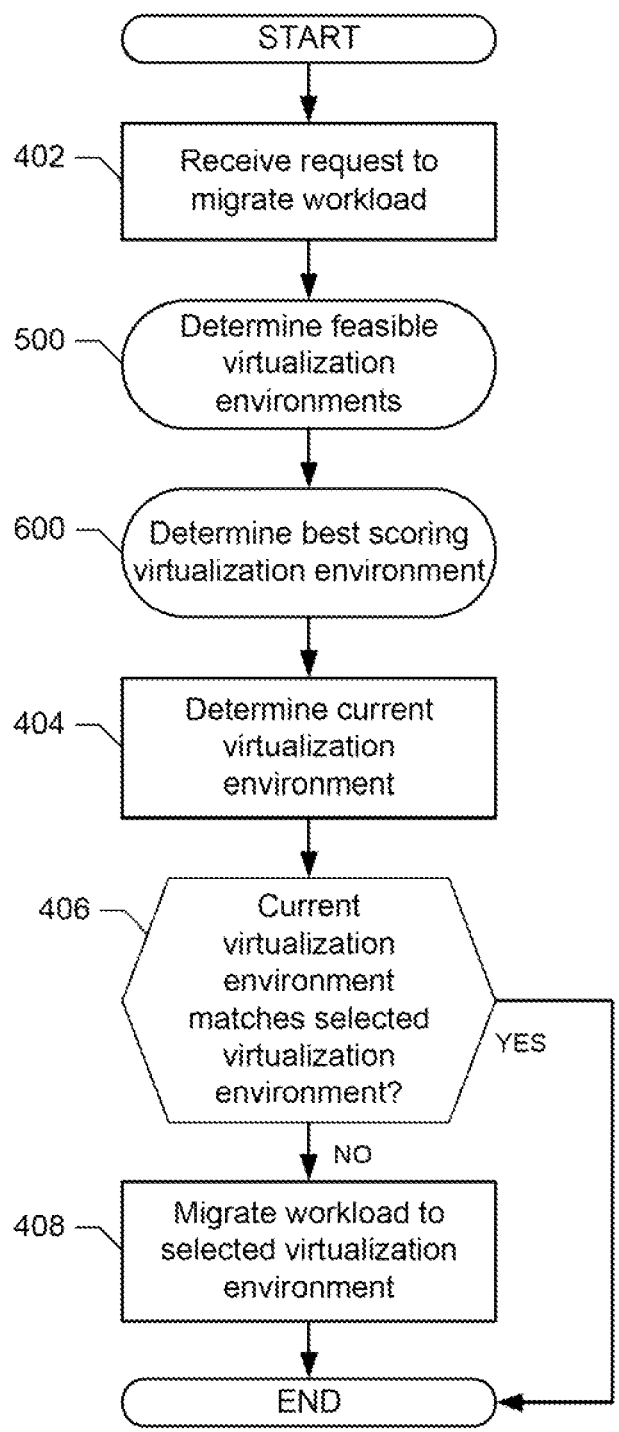

FIG. 4 is a flowchart of example machine readable instructions that may be executed to migrate a workload (e.g., the workload 141 of FIG. 1) that is currently deployed on a first virtualization platform (e.g., the example first virtualization platform 107) to a second virtualization platform (e.g., the example third virtualization platform 109). The process of FIG. 4 begins when the workload analyzer 202 receives an identification of the deployed workload 141 to be migrated (block 402). For example, the workload 141 may be identified during a periodic review of deployed workloads, may be identified by a user utilizing the example management client 114 of FIG. 1, etc. The example virtualization platform manager 112 of FIGS. 1 and 2 then, as described in conjunction with the process 500 of FIG. 5, determines which of the example virtualization platforms 107-109 of FIG. 1 are capable of performing the example workload 141 (block 500). The example virtualization platform manager 112 then, as described in conjunction with the process 600 of FIG. 6, determines which one of the example virtualization platforms 107-109 (of the virtualization platforms 107-109 determined to be capable of executing the workload 141 in block 500) received the best score (block 600).

The example workload migrator 214 of FIG. 2 then determines the current virtualization platform 107-109 in which the workload 141 is deployed (block 404). The workload migrator 214 determines if the virtualization platform 107-109 identified in block 600 is the same as the current virtualization platform 107-109 in which the workload 141 is already deployed (block 406). If the workload 141 is already deployed in the virtualization platform 107-109 identified in block 600, the process of FIG. 4 ends.

If the workload 141 is not already deployed in the virtualization platform 107-109 identified in block 600 (block 406), the example workload migrator 214 migrates the workload 141 from the current one of the virtualization platforms 107-109 to the one of the virtualization platforms 107-109 identified in block 600 (block 408). For example, the workload migrator 214 may cause the deployed workload 141 to be suspended and/or shutdown, exported from the current virtualization platform 107-109, imported into the virtualization platform 107-109 identified in block 600, and woken and/or restarted. Alternatively, the workload migrator 214 may perform a live migration of the example workload 141 from the current virtualization platform 107-109 to the virtualization platform 107-109 identified in block 600.

Figure 5:
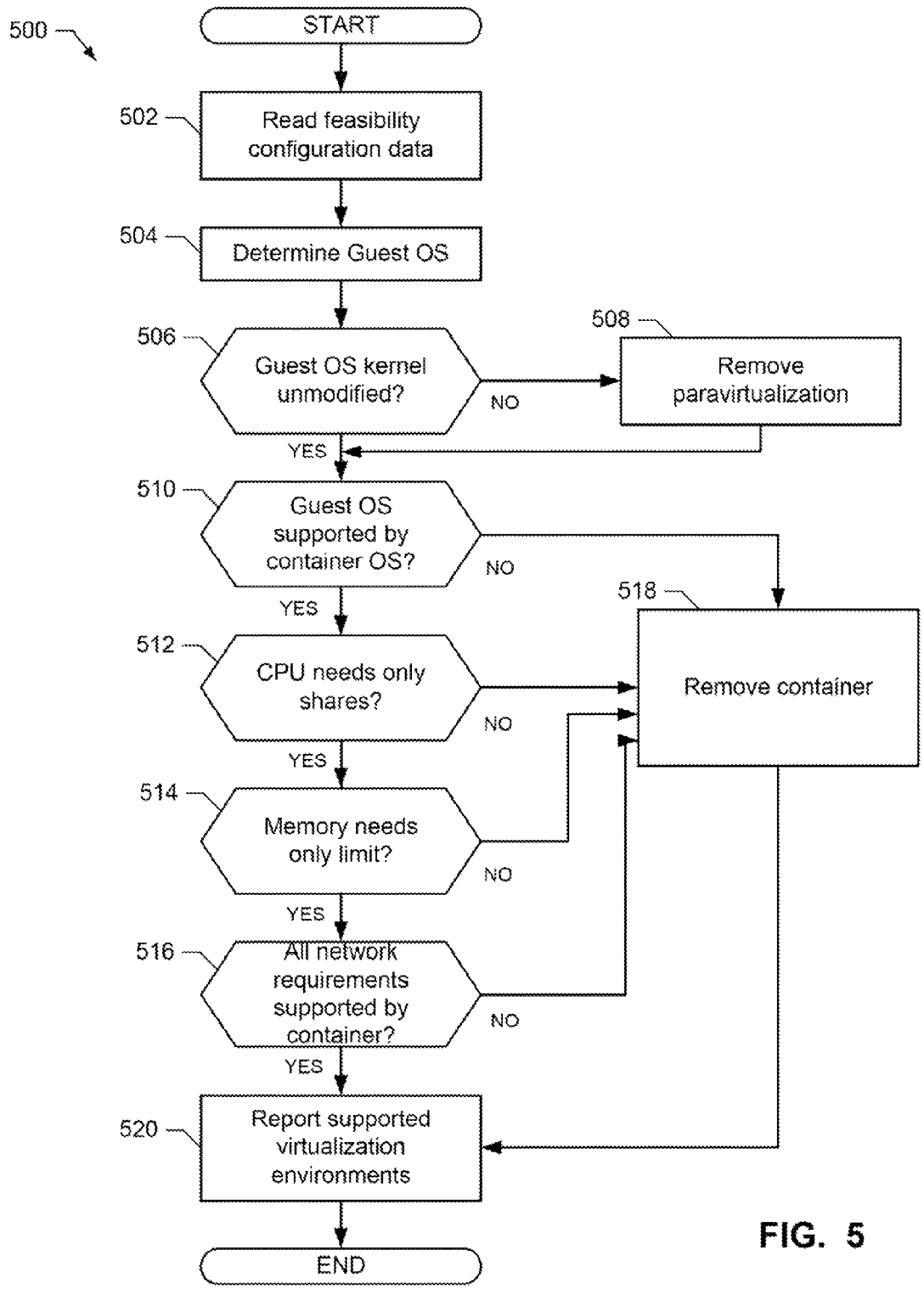

FIG. 5 is a flowchart illustrating an example process 500 to determine feasibility information for executing the workload 140, 141 on the virtualization platforms 107-109. The example process of FIG. 5 begins when the example feasibility analyzer 206 retrieves feasibility configuration data from the example configuration datastore 208 (block 502). The process illustrated by blocks 504-518 is based on the rules identified in the feasibility configuration data. The process of blocks 504-518 may vary based on the rules identified in the feasibility configuration data.

The example workload analyzer 202 retrieves an identification of the guest operating system associated with the workload 140, 141 (block 504). The example feasibility analyzer 206 determines if the guest operating system identified by the workload analyzer 202 is unmodified (block 506). For example, the workload analyzer 202 may determine if the guest operating system has a modified kernel. If the guest operating system is modified (e.g., a modified kernel), the example feasibility analyzer 206 removes any paravirtualization environments (e.g., the second virtualization platform 108) from the set of available virtualization platforms (block 508).

The example feasibility analyzer 206 then determines if the guest operating system associated with the workload 140, 141 is supported by operating system virtualization environments (e.g., the third virtualization platform 109) (block 510). When the guest operation system is not supported by the operating system virtualization environments, the example feasibility analyzer 206 removes any operating system virtualization environments (e.g., the third virtualization platform 109) from the set of available virtualization platforms (block 518).

If the guest operating system is supported by the operating system virtualization environments (block 510), the example feasibility analyzer 206 then determines if the processing requirements of the workload 140, 141 allow the use of shares (e.g., shared accesses the processing resources) rather than reserved processing resources (block 512). When the workload 140, 141 requests and/or requires reversed processing resources, the example feasibility analyzer 206 removes any operating system virtualization environments (e.g., the third virtualization platform 109) from the set of available virtualization platforms (block 518).

If the processing requirements of the workload 140,141 allow the use of shares (block 512), the example feasibility analyzer 206 then determines if the memory requirements of the workload 140, 141 allow the use of limits (e.g., a maximum amount of shared memory that may be utilized) rather than reserved memory (block 514). When the workload 140, 141 requests and/or requires reversed memory resources, the example feasibility analyzer 206 removes any operating system virtualization environments (e.g., the third virtualization platform 109) from the set of available virtualization platforms (block 518).

If the memory requirements allow the use of limits (block 514), the example feasibility analyzer 206 then determines if the network requirements of the workload 140, 141 include any requirements that cannot be handled by the operating system virtualization environments (block 516). For example, the workload 140, 141 may require virtual switch functionality that is not supported by operating system virtualization environments. When the workload 140, 141 requests and/or requires network requires that cannot be handled by operating system virtualization environments, the example feasibility analyzer 206 removes any operating system virtualization environments (e.g., the third virtualization platform 109) from the set of available virtualization platforms (block 518).

After checking feasibility requirements (e.g., blocks 506 and 510-516) and removing ones of the virtualization platforms 107-109 (e.g., the containers) that do not meet the requirements of the workload 140, 141 (e.g., blocks 508 and 518), the example feasibility analyzer 206 communicates supported ones of the example virtualization platforms 107-109 to the score generator 210 (block 520). For example, the feasibility analyzer 206 may store an identification of the supported ones of the example virtualization platforms 107-109 in the example configuration datastore 208.

Figure 6:
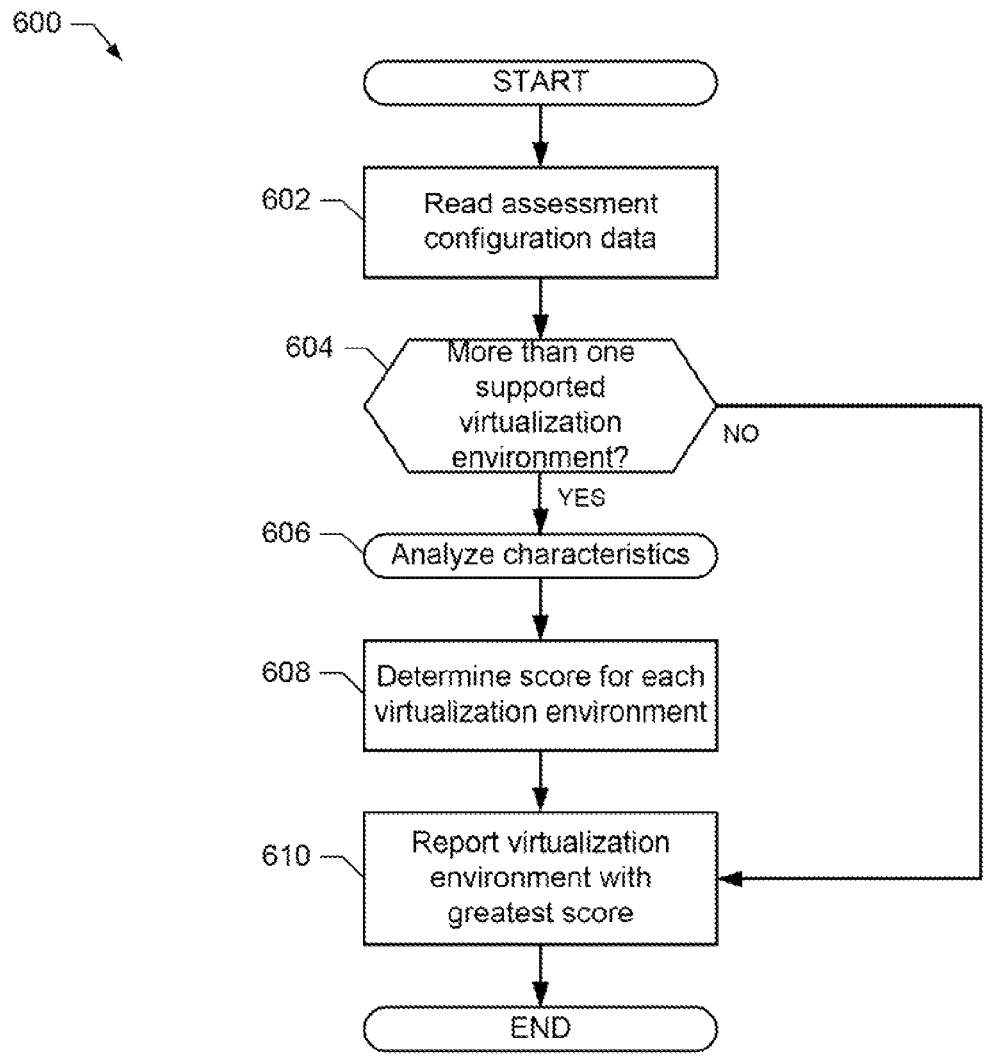

FIG. 6 is a flowchart illustrating an example process 600 to determine score information for executing the workload 140, 141 on the virtualization platforms 107-109. The example process of FIG. 6 begins when the example score generator 210 retrieves assessment configuration data from the example configuration datastore 208 (block 602).

The score generator 210 determines if more than one of the example virtualization platforms 107-109 were identified by the feasibility analyzer 206 as supported for executing the workload 140, 141 (block 604). If only one of the virtualization platforms 107-109 were identified as supported (e.g., by the process illustrated in FIG. 5), the example score generator 210 reports the selected one of the virtualization platforms 107-109 to the workload deployer 212 and the workload migrator 214 (block 610).

If more than one of the virtualization platforms 107-109 were identified as supported (block 604), the example score generator 210 analyzes the characteristics of the workload 140, 141 and the characteristics of the virtualization platforms 107-109 (block 606). An example process for analyzing the characteristics of the workload 140, 141 and the characteristics of the virtualization platforms 107-109 is described in conjunction with FIG. 7.

After analyzing the characteristics of the workload 140, 141 and the characteristics of the virtualization platforms 107-109, the example score generator 210 determines a score for each of the virtualization platforms 107-109 (block 608). For example, the score generator 210 may translate ranking information into numerical scores. According to the illustrated example, the score is associated with a combination of the workload and the virtualization platform. Thus, if two workloads are analyzed against three platforms, a first set of scores will be generated for the first workload (e.g., one score for each platform) and the greatest score may be selected and a second set of scores (e.g., one score for each platform) will be generated for the second workload and the greatest score among the second set of scores may be selected.

The example score generator 210 then determines one of the virtualization platforms 107-109 with the greatest score and reports the one of the virtualization platforms 107-109 with the greatest score to the workload deployer 212 and the workload migrator 214 (block 610).

Figure 7:
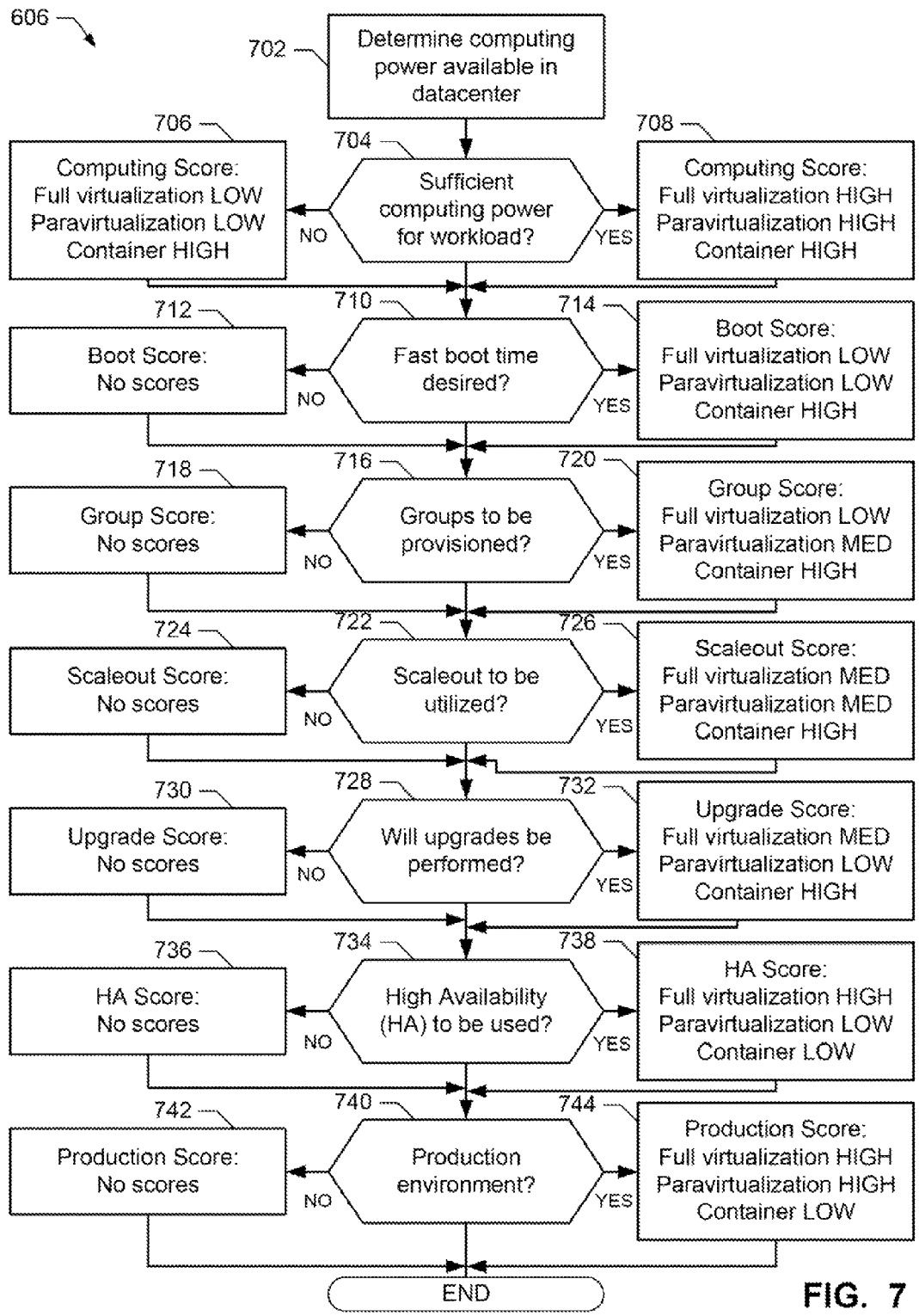

FIG. 7 illustrates an example process for scoring the virtualization platforms 107-109 for execution of the example workload 140, 141. The process of FIG. 7 may be utilized to implement block 606 of FIG. 6.

The example process of FIG. 7 begins when the virtualization environment analyzer 204 determines an amount of computing resources available the virtual computing environment 100 (block 702). For example, the virtualization environment analyzer 204 may query an API associated with the virtual computing environment 100 to determine an amount of RAM that is available for allocation to new workloads in virtualization platforms 107-109. The score generator 210 then compares the available resources for the virtual computing environment 100 to resource requirements determined the example workload analyzer 202 to determine if the virtual computing environment has sufficient resources to allocate to the workload 140, 141 (block 704). If sufficient resources are not available to allocate to the workload 140, 141, then shared resource, low overhead environments can be utilized (e.g., the operating system virtualization environments such as the third virtualization platform 109). Accordingly, the full virtualization and paravirtualization environments are tagged with LOW scores and the operating system virtualization (e.g., container environment) is tagged with a HIGH score (block 706). Alternatively, if sufficient resources are available to allocate to the workload 140, 141, all virtualization environments are tagged with the HIGH score (block 708).

The score generator 210 then determines if a fast boot time is desired for the guest operating system of the workload 140, 141 (block 710). For example, the workload analyzer 202 may determine that a fast boot time is desired based on configuration information associated with the workload 140, 141. Alternatively, the score generator 210 may prompt a user (e.g., utilizing the management client 114) to indicate if a fast boot time for the workload is desired. If a fast boot time is not desired and/or is not a requirement, no scores are tagged to the virtualization platforms 107-109 (block 712). Alternatively, if a fast boot time is desired and/or is a requirement, the full virtualization and paravirtualization environments are tagged with LOW scores and the operating system virtualization is tagged with a HIGH score (block 714).

The score generator 210 then determines if groups of elements will be provisioned (e.g., several virtual machines and/or containers that utilize the same guest operating system (block 716). For example, the workload analyzer 202 may determine that the workload includes a group of elements by analyzing the information contained in the workload 140, 141. Alternatively, the score generator 210 may prompt a user (e.g., utilizing the management client 114) to indicate if a group of elements is included in the workload 140, 141 or will be desired. If a group of elements is not included in the workload 140, 141, no scores are tagged to the virtualization platforms 107-109 (block 718). Alternatively, if a group of elements is included in the workload 140, 141 or will be desired, the full virtualization environments are tagged with a LOW score, the paravirtualization environments are tagged with a MEDIUM score, and the operating system virtualizations are tagged with a HIGH score (block 720).

The score generator 210 then determines if scaleout is needed or desired for the workload 140, 141 (block 722). For example, the score generator 210 may prompt a user (e.g., utilizing the management client 114) to indicate if scaleout will be required or desired. Scaleout is a process by which additional instances of a workload are deployed (e.g., to handle additional client accesses). If scaleout is not desired, no scores are tagged to the virtualization platforms 107-109 (block 724). Alternatively, if scaleout is desired, the full virtualization environments and the paravirtualization environments are tagged with a MEDIUM score and the operating system virtualizations are tagged with a HIGH score (block 726).

The score generator 210 then determines if the guest operating system of the workload 140, 141 will be upgraded at a later time (e.g., will security patches or other upgrades be installed after the workload 140, 141 is deployed) (block 728). For example, the assessment configuration data may indicate which guest operating systems utilize security patches. Alternatively, the example score generator 210 may prompt a user (e.g., utilizing the management client 114) to indicate if upgrades will be installed. If upgrades will not be installed, no scores are tagged to the virtualization platforms 107-109 (block 730). Alternatively, if upgrades will be installed after deployment of the workload, the full virtualization environments are tagged with a MEDIUM score, the paravirtualization environments are tagged with a LOW score, and the operating system virtualizations are tagged with a HIGH score (block 732).

The score generator 210 then determines if high availability (HA) (e.g., failure tolerant, failover capabilities, redundant operation, etc.) is needed or desired for the workload 140, 141 (block 734). For example, the score generator 210 may prompt a user (e.g., utilizing the management client 114) to indicate if HA will be required or desired. If HA is not desired, no scores are tagged to the virtualization platforms 107-109 (block 736). Alternatively, if HA is desired, the full virtualization environments are tagged with a HIGH score and the paravirtualization environments and the operating system virtualizations are tagged with a LOW score (block 738).

The score generator 210 then determines if the workload 140, 141 is utilized in a production environment (e.g., as opposed to a development and/or testing environment) (block 740). For example, the score generator 210 may prompt a user (e.g., utilizing the management client 114) to indicate if workload 140, 141 is and/or will be utilized in a production environment. If the workload 140, 141 is not and/or will not be utilized in a production environment, no scores are tagged to the virtualization platforms 107-109 (block 742). Alternatively, if the workload 140, 141 is and/or will be utilized in a production environment, the full virtualization environments and the paravirtualization environments are tagged with a HIGH score and the operating system virtualizations are tagged with a LOW score (block 744).

Accordingly, in accordance with FIGS. 7 and 1, the first virtualization platform 107 is tagged according to the tags assigned to full virtualization environments, the second virtualization platform 108 is tagged according to the tags assigned to paravirtualization environments, and the third virtualization platform 109 is tagged according to the tags assigned to operating system virtualization environments.

Following the tagging of the example virtualization platforms 107-109, the scores of LOW, MEDIUM, and HIGH are assigned numerical values and summed in block 608 of FIG. 6. For example, the LOW tags may be scored as a value of 1, the MEDIUM tags may be scored as a value of 2, and the HIGH tags may be scored as a value of 3. In addition, in some examples, a weighted averaging is applied to the scores based on an importance of each score as indicated in the assessment configuration data. For example, the scores associated with blocks 704 and 740 may be ranked with HIGH importance (e.g., a weight of 3), the scores associated with blocks 710, 722, 728, and 734 may be ranked with MEDIUM importance (e.g., a weight of 2), and the scores associated with block 716 may be ranked with a LOW importance (e.g., a weight of 1). The weighted scores for of the virtualization platforms 107-109 may be computed by multiplying the importance values times the associated tagged scores and summing the products individually for each of the virtualization platforms 107-109.

Figure 8:
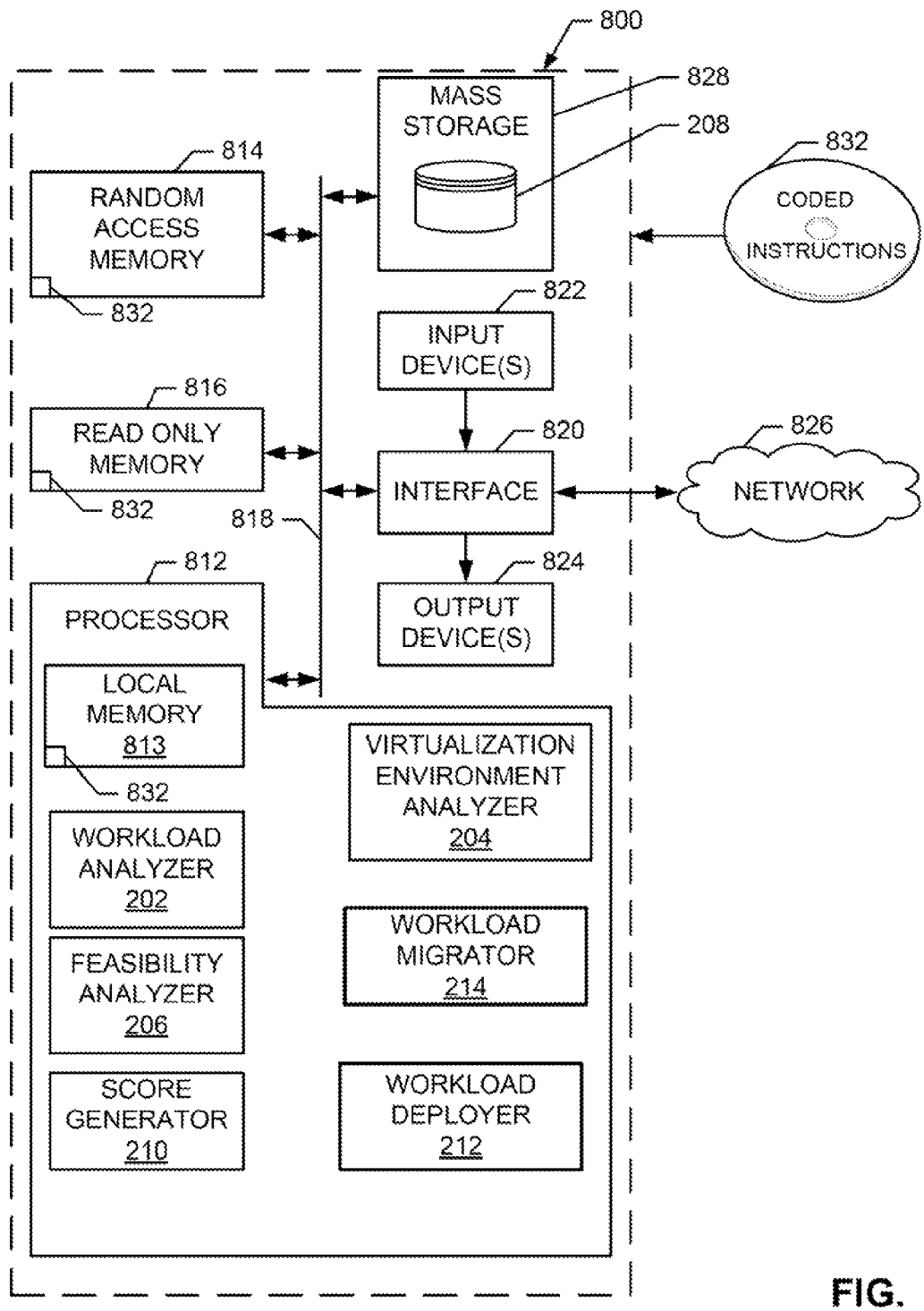
FIG. 8 is a block diagram of an example processing platform capable of executing the example machine-readable instructions of FIGS. 3-7 to implement the example virtualization platform manager of FIGS. 1 and/or 2.

FIG. 8 is a block diagram of an example processor platform 800 capable of executing the instructions of FIGS. 3-7 to implement the virtualization platform manager 112 of FIGS. 1 and/or 2. The processor platform 800 can be, for example, a server, a personal computer, a mobile device (e.g., a cell phone, a smart phone, a tablet such as an iPad™), a personal digital assistant (PDA), an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The example processor includes the example workload analyzer 202, the example virtualization environment analyzer 204, the example feasibility analyzer 206, the example score generator 210, the example workload deployer 212, and the example workload migrator 214 of FIG. 2 to implement the example virtualization platform manager 112 of FIGS. 1 and/or 2. The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. The example mass storage 828 includes the example configuration datastore 208 of FIG. 2. Examples of such mass storage devices 828 include floppy disk drives, hard drive disks, compact disk drives, Blu-ray disk drives, RAID systems, and digital versatile disk (DVD) drives.

The coded instructions 832 of FIGS. 3-7 may be stored in the mass storage device 828, in the volatile memory 814, in the non-volatile memory 816, and/or on a removable tangible computer readable storage medium such as a CD or DVD.

While the examples disclosed herein are described as being implemented on server hardware, any other type of hardware resources may be utilized. For example, the example methods and apparatus disclosed herein may be implemented on any combination of servers, desktop computing devices, laptop computing devices, mobile computing devices, etc.

From the foregoing, it will be appreciated that some of the example methods and apparatus disclosed herein facilitate selection of a virtualization environment for a virtualized application (e.g., a workload). In some example methods and apparatus, a virtualization environment is selected and a workload is deployed in the selected virtualization environment to reduce the amount of computing resources that would be utilized by executing the workload in a less-optimal virtualization environment. For example, example methods and apparatus analyze characteristics of the workload and characteristics of the virtualization environments to select among full virtualization environments, paravirtualized environments, and operation system virtualization environments. In some such examples, the characteristics include determining an amount of computing resources needed for executing the workload and comparing the amount of computing resources to the amount of computing resources available in a data center. When the data center includes sufficient computing resources, all three virtualization environment types are scored equally. However, when the data center does not include sufficient computing resources to meet the demands of the workload, the operating system virtualization environment is selected because it can more efficiently allocate the shared resources of the data center for use in executing the workload. Thus, applying example methods and apparatus disclosed herein during deployment of new workloads or transition of already deployed workloads results in more efficient utilization of computing resources of a data center by selecting a virtualization environment that is determined to be optimal. Furthermore, a platform management solution implemented according to the methods and apparatus disclosed herein can automatically (e.g., upon deployment, periodically, aperiodically, etc.) migrate a workload from one platform to another to optimally utilize the resources of a datacenter.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
  determining, by executing an instruction via a processor, characteristics of a virtualized application that is deployed in an existing virtualization environment;
  analyzing, by executing an instruction via the processor, the characteristics of the virtualized application to select a subset of virtualization environments that are capable of executing the virtualized application, the subset of virtualization environments selected from a set of virtualization environments of different virtualization environment types used in a datacenter;
  comparing, by executing an instruction via the processor, the characteristics of the virtualized application to the virtualization environments of the subset of virtualization environments to determine scores for the virtualization environments;
  determining if the virtualized application includes a plurality of applications to be deployed using the same operating system;
  when the virtualized application includes the plurality of applications to be deployed, increasing, by a first amount, a first score for a first virtualization environment that utilizes operating system virtualization, the first amount being greater than a second amount by which a second score is increased for a second virtualization environment that utilizes full virtualization; and
  migrating the virtualized application from the existing virtualization environment to a new virtualization environment based on the scores.

2. A method as defined in claim 1, wherein determining the characteristics includes determining an amount of computing resources for the virtualized application.

3. A method as defined in claim 2, wherein comparing the characteristics of the virtualization environments includes comparing an amount of computing resources for the virtualized application to an amount of computing resources available in the virtualization environments.

4. A method as defined in claim 1, further including accessing stored assessment configuration data to determine a set of assessment criteria to be used in determining the scores.

5. A method as defined in claim 1, wherein determining the characteristics for the virtualized application includes obtaining user input regarding the execution of the virtualized application.

6. A method as defined in claim 1, wherein the virtualization environment types include full virtualization, paravirtualization, and operation system virtualization.

7. An apparatus comprising:
  a workload analyzer to determine characteristics of a virtualized application that is deployed in an existing virtualization environment and to determine if the virtualized application includes a plurality of applications to be deployed using the same operating system;
  a feasibility analyzer to analyze the characteristics of the virtualized application to select a subset of virtualization environments that are capable of executing the virtualized application, the subset of virtualization environments selected from a set of virtualization environments of different virtualization environment types used in a datacenter;

a score generator to compare the characteristics of the virtualized application to the virtualization environments of the subset of virtualization environments to determine scores for the virtualization environments and, when the virtualized application includes the plurality of applications to be deployed, increase, by a first amount, a first score for a first virtualization environment that utilizes operating system virtualization, the first amount being greater than a second amount by which a second score is increased for a second virtualization environment that utilizes full virtualization; and a workload migrator to migrate the virtualized application from the existing virtualization environment to a new virtualization environment based on the scores.

8. An apparatus as defined in claim 7, wherein the workload analyzer is to determine the characteristics by determining an amount of computing resources available in the virtualized application.

9. An apparatus as defined in claim 8, wherein the score generator is to compare the characteristics of the virtualization environments includes comparing an amount of computing resources for the virtualized application to an amount of computing resources for the virtualization environments.

10. An apparatus as defined in claim 7, wherein the score generator is to access stored assessment configuration data to determine a set of assessment criteria to be used in determining the scores.

11. An apparatus as defined in claim 7, wherein the workload analyzer is to determine the characteristics for the virtualized application by obtaining user input regarding the execution of the virtualized application.

12. An apparatus as defined in claim 7, wherein the virtualization environment types include full virtualization, paravirtualization, and operation system virtualization.

13. A tangible computer readable storage disk or device comprising instructions that, when executed, cause a machine to at least:

determine, via a processor, characteristics of a virtualized application that is deployed in an existing virtualization environment;

analyze, via the processor, the characteristics of the virtualized application to select a subset of virtualization environments that are capable of executing the virtualized application, the subset of virtualization environments selected from a set of virtualization environments of different virtualization environment types used in a datacenter;

compare, via the processor, the characteristics of the virtualized application to the virtualization environments of the subset of virtualization environments to determine scores for the virtualization environments;

determine if the virtualized application includes a plurality of applications to be deployed using the same operating system;

when the virtualized application includes the plurality of applications to be deployed, increase, by a first amount, a first score for a first virtualization environment that utilizes operating system virtualization, the first amount being greater than a second amount by which a second score is increased for a second virtualization environment that utilizes full virtualization; and migrate the virtualized application from the existing virtualization environment to a new virtualization environment based on the scores, wherein the tangible computer readable storage disk or device is not a signal.

14. A tangible computer readable storage disk or device as defined in claim 13, wherein the instructions, when executed, cause the machine to determine the characteristics by determining an amount of computing resources available in the virtualized application.

15. A tangible computer readable storage disk or device as defined in claim 14, wherein the instructions, when executed, cause the machine to compare the characteristics of the virtualization environments by comparing an amount of computing resources for the virtualized application to an amount of computing resources for the virtualization environments.

16. A tangible computer readable storage disk or device as defined in claim 13, wherein the instructions, when executed, cause the machine to access stored assessment configuration data to determine a set of assessment criteria to be used in determining the scores.

17. A tangible computer readable storage disk or device as defined in claim 13, wherein the instructions, when executed, cause the machine to determine the characteristics for the virtualized application by obtaining user input regarding the execution of the virtualized application.

18. A tangible computer readable storage disk or device as defined in claim 13, wherein the virtualization environment types include full virtualization, paravirtualization, and operation system virtualization.

\* \* \* \* \*